US011155733B2

(12) United States Patent
Mitsumoto et al.

(10) Patent No.: US 11,155,733 B2
(45) Date of Patent: Oct. 26, 2021

(54) FRICTION MATERIAL COMPOSITION, AND FRICTION MATERIAL AND FRICTION MEMBER EACH OBTAINED USING FRICTION MATERIAL COMPOSITION

(71) Applicants: HITACHI CHEMICAL COMPANY, LTD., Tokyo (JP); NISSAN MOTOR CO., LTD., Kanagawa (JP)

(72) Inventors: Masamichi Mitsumoto, Tokyo (JP); Yoshio Ogata, Kanagawa (JP)

(73) Assignees: Showa Denko Materials Co., Ltd., Tokyo (JP); NISSAN MOTOR CO., LTD, Kanagawa (JP)

( * ) Notice: Subject to any disclaimer, the term of this patent is extended or adjusted under 35 U.S.C. 154(b) by 0 days.

(21) Appl. No.: 16/755,333

(22) PCT Filed: Oct. 10, 2018

(86) PCT No.: PCT/JP2018/037781
§ 371 (c)(1),
(2) Date: Apr. 10, 2020

(87) PCT Pub. No.: WO2019/074012
PCT Pub. Date: Apr. 18, 2019

(65) Prior Publication Data
US 2020/0308461 A1 Oct. 1, 2020

(30) Foreign Application Priority Data
Oct. 11, 2017 (JP) .............................. JP2017-197555

(51) Int. Cl.
| C08K 3/14 | (2006.01) |
| F16D 69/02 | (2006.01) |
| C08L 61/14 | (2006.01) |
| C09K 3/14 | (2006.01) |
| C08K 3/013 | (2018.01) |
| C08K 3/04 | (2006.01) |
| C08K 3/08 | (2006.01) |
| C08K 3/20 | (2006.01) |
| C08K 3/30 | (2006.01) |
| C08K 5/54 | (2006.01) |
| C08K 3/22 | (2006.01) |

(52) U.S. Cl.
CPC ................ *C09K 3/14* (2013.01); *C08K 3/013* (2018.01); *C08K 3/04* (2013.01); *C08K 3/08* (2013.01); *C08K 3/20* (2013.01); *C08K 3/30* (2013.01); *C08K 5/54* (2013.01); *C08L 61/14* (2013.01); *F16D 69/023* (2013.01); *F16D 69/025* (2013.01); *F16D 69/027* (2013.01); *C08K 2003/0893* (2013.01); *C08K 2003/2227* (2013.01); *C08K 2003/2237* (2013.01); *C08K 2003/2244* (2013.01); *C08K 2003/3009* (2013.01)

(58) Field of Classification Search
CPC ...... F16D 69/025; F16D 69/027; C08L 61/14; C08K 2003/2227
See application file for complete search history.

(56) References Cited

U.S. PATENT DOCUMENTS

| 7,338,987 | B2 * | 3/2008 | Ono ...................... F16D 69/026 |
| | | | 523/149 |
| 9,394,585 | B2 * | 7/2016 | Shimano ............... H01M 4/525 |

FOREIGN PATENT DOCUMENTS

| CN | 1572857 A | 2/2005 |
| CN | 107001915 A | 8/2017 |
| JP | 2002-138273 A | 5/2002 |
| JP | 2004-346179 A | 12/2004 |
| JP | 2015-004037 A | 1/2015 |
| JP | 2016-153440 A | 8/2016 |
| JP | 2017-2185 A | 1/2017 |
| JP | 2017-2186 | 1/2017 |
| JP | 2017-141352 | 8/2017 |

OTHER PUBLICATIONS

International Preliminary Report on Patentability in Appln. No. PCT/JP2018/037781, dated Dec. 26, 2019.

* cited by examiner

*Primary Examiner* — Vickey Nerangis
(74) *Attorney, Agent, or Firm* — Fitch, Even, Tabin & Flannery, LLP

(57) ABSTRACT

A friction material composition containing a binder, an organic filler, an inorganic filler and a fibrous base material, wherein the friction material composition either contains no copper as an element or has a content of copper as an element that does not exceed 0.5% by mass, contains α-alumina and γ-alumina in a mass ratio within a range from 1:20 to 1:5, contains a silicone-containing phenol resin, contains 20 to 35% by mass of a titanate salt, contains 3 to 7% by mass of a graphite having a median diameter of 1 to 30 μm, and contains antimony trisulfide.

10 Claims, No Drawings

FRICTION MATERIAL COMPOSITION, AND FRICTION MATERIAL AND FRICTION MEMBER EACH OBTAINED USING FRICTION MATERIAL COMPOSITION

CROSS-REFERENCE TO RELATED APPLICATIONS

This application is a U.S. national phase application filed under 35 U.S.C. § 371 of International Application No. PCT/JP2018/037781, filed Oct. 10, 2018, designating the United States, which claims priority from Japanese Patent Application No. 2017-197555, filed Oct. 11, 2017, which are hereby incorporated herein by reference in their entirety.

TECHNICAL FIELD

The present invention relates to a friction material composition suitable for a friction material such as a disc brake pad or brake lining used in braking an automobile or the like, and also relates to a friction material and a friction member that are each obtained using the friction material composition, and relates particularly to a friction material composition that contains no asbestos, a so-called non-asbestos friction material.

BACKGROUND ART

Friction materials such as disc brake pads and brake linings are used for performing braking in automobiles and the like. Friction materials such as disc brake pads and brake linings perform a braking role by friction against a mating material such as a disc rotor or a brake drum. Accordingly, the friction material not only requires a friction coefficient (efficacy characteristic) appropriate for the usage conditions, but also requires other properties such as resistance to brake squealing (squealing characteristic) and long life for the friction material (abrasion resistance).

Friction materials may be broadly classified into semi-metallic materials which contain 30 to 60% by mass of steel fibers as fibrous base materials, low-steel materials which contain less than 30% by mass of steel fibers, and NAO (non-asbestos organic) materials which contain no steel fibers. However, friction materials containing trace amounts of steel fibers are sometimes also classified as NAO materials.

NAO materials either contain no steel fibers, or have an extremely low steel fiber content, and therefore exhibit reduced attack on the disc rotor that functions as the mating material compared with semi-metallic materials and low-steel materials. Because of such advantages, NAO materials that exhibit superior balance in terms of efficacy, squealing and abrasion resistance are now mainstream in Japan and the Unites States of America. Further, although low-steel materials are widely used in Europe from the viewpoint of friction coefficient maintenance during high-speed braking, as a result of recent trends toward higher class products, the use of NAO materials which are more resistant to tire wheel soiling and brake squealing is also increasing.

Currently, mainstream NAO materials generally contain copper in either fibrous or powder form. As described below, copper is an important material that may be regarded as essential in conventional NAO materials. However, because friction materials that contain copper or a copper alloy produce an abrasion powder during braking that contains copper, it is suggested that there is a possibility of contamination of rivers and lakes. As a result, in states such as California and Washington in the Unites States of America, bills have been passed that prohibit the sale or fitting in new cars of friction materials containing 5% by mass or more of copper from 2021, and friction materials containing 0.5% by mass or more of copper from 2023, and in order to conform to these bills, the development of NAO materials that either contain no copper or have a very low copper content has become a matter of urgency.

One representative function of copper is the impartation of thermal conductivity. Because copper has a high thermal conductivity, the heat generated during braking can be diffused from the friction interface, enabling suppression of abrasion of the friction material caused by excessive temperature increase, and suppression of vibrations or the like during braking (judder).

A second representative function of copper is the protection of the friction interface during high-temperature braking. Because copper exhibits superior ductility and malleability, it can expand across the friction material surface during braking to form a coating film. As a result, abrasion of the friction material during high-speed and high-temperature braking can be reduced, and a stable friction coefficient can be achieved.

Accordingly, in order to develop NAO materials that either contain no copper or have a very low copper content, a technical alternative to copper is required from the viewpoints of improvement in thermal conductivity and interface protection described above.

In light of these trends, some technologies relating to friction materials that either contain no copper or have a very low copper content have already been proposed (such as Patent Documents 1 and 2).

CITATION LISTS

Patent Documents

Patent Document 1: JP 2002-138273 A
Patent Document 2: JP 2015-004037 A

SUMMARY OF THE INVENTION

Technical Problem

However, in recent years, an additional issue has arisen from a viewpoint that is different from those of the copper alternatives mentioned above. This issues relates to applicability to controlled braking typified by the increasingly widespread regenerative braking. In conventional hydraulic brakes, the vehicle braking force is adjusted appropriately by fine adjustment of the input from the brake pedal by the driver. However, in the case of controlled brakes, a portion of the braking is borne by the system, and if the friction coefficient generated by the friction material fluctuates dramatically, then control can become difficult. For example, if the friction coefficient increases excessively, then sudden braking or brake squealing can sometimes occur. In contrast, if the friction coefficient decreases excessively, then there is a possibility that the braking distance may lengthen. Accordingly, in order to improve the accuracy of controlled braking, ensuring that the friction coefficient generated by the friction material remains stable at all times is extremely important.

Typical examples of a case in which the friction coefficient fluctuates include the increase in the friction coefficient observed after standing at high humidity. When a vehicle is left to stand under conditions of high humidity, various changes may occur, examples thereof including rusting of the surface of the disc rotor and abrasion powder from the disc rotor present at the friction interface; a decrease in the elastic modulus of the friction material surface layer, whereby an increase in the contact surface area between the friction material and the disc rotor during braking may be easily caused; and covering of fine irregularities at the friction interface with moisture. As a result, the friction coefficient can sometimes increase dramatically compared with that observed normally. In such cases, sudden braking or brake squealing described above may occur, adversely affecting the comfort of the driver.

Considering these types of issues, Patent Documents 1 and 2 focused on the superior thermal conductivity and high-temperature lubricity of copper, with an aim of supplementing the friction characteristics during high-speed and high-temperature braking, but gave no consideration to the stability of the friction coefficient after standing at high humidity or any other friction characteristics. For example, Patent Document 1 discloses a method in which in order to supplement the thermal conductivity, magnesium oxide and graphite are included in the friction material in an amount of 45 to 80% by volume instead of copper, with the ratio between the magnesium oxide and graphite being within a range from 1/1 to 4/1, but because the amounts added of magnesium oxide which functions as an abrasive and graphite which functions as a lubricant are extremely large, improving the various friction characteristics with good balance is problematic.

Further, Patent Document 2 discloses a method in which in order to supplement the high-temperature lubricity, ferrous sulfide is included in an amount of 1 to 15% by mass instead of copper, and flake graphite with an average particle diameter of 1 to 100 μm is included in an amount of 0.3 to 5% by mass to improve the abrasion resistance and the friction coefficient during high-speed and high-temperature braking. However, similarly to Patent Document 1, it is difficult to also achieve favorable stability of the friction coefficient after standing at high humidity.

Accordingly, an object of the present invention is to provide a friction material composition that can produce a friction material which either contains no copper as an element or has a content thereof that does not exceed 0.5% by mass, and is not only capable of maintaining the friction coefficient during high-speed and high-temperature braking, but is also resistant to an increase in the friction coefficient after standing at high humidity, namely a friction material that exhibits a stable friction coefficient with respect to braking conditions and with respect to environmental changes.

Solution to Problem

As a result of intensive investigation, the inventors of the present invention have discovered that by supplementing the superior thermal conductivity of copper with graphite of a specific particle diameter, supplementing the friction interface protection effect of copper with a titanate salt, and also including a specific proportion of an abrasive having a specific hardness and particle diameter, it is possible to maintain the friction coefficient during high-speed and high-temperature braking while an adverse effect on the abrasion resistance is limited. Moreover, they have also discovered that by using a phenol resin having superior water repellency as a binder, it is possible to obtain a friction material composition for which the friction coefficient is less likely to rise after standing at high humidity.

An embodiment of the present invention relates to a friction material composition containing a binder, an organic filler, an inorganic filler and a fibrous base material, wherein the friction material composition either contains no copper as an element or has a content of copper as an element that does not exceed 0.5% by mass, contains α-alumina and γ-alumina in a mass ratio within a range from 1:20 to 1:5, contains a silicone-containing phenol resin, contains 20 to 35% by mass of a titanate salt, contains 3 to 7% by mass of a graphite having a median diameter of 1 to 30 μm, and contains antimony trisulfide.

Further, another embodiment of the present invention relates to a friction material obtained molding the friction material composition described above. Yet another embodiment of the present invention relates to a friction member including a friction material obtained by molding the friction material composition described above and a backing plate integrated with the friction material.

Advantageous Effects of the Invention

According to the present invention, it is possible to provide a friction material composition that can produce a friction material which, when used as a friction material such as a disc brake pad or brake lining for an automobile, is not only capable of maintaining the friction coefficient during high-speed and high-temperature braking, but is also resistant to an increase in the friction coefficient after standing at high humidity, namely a friction material that exhibits a stable friction coefficient with respect to braking conditions and with respect to environmental changes. Further, it is also possible to provide a friction material and a friction member that are each obtained using the friction material composition. Furthermore, according to the present invention, it is possible to provide a friction material and a friction member having the characteristics described above.

DESCRIPTION OF EMBODIMENTS

The friction material composition of the present invention, and the friction material and friction member obtained using the friction material composition are described below in further detail. The friction material composition of the present invention is a friction material composition that contains no asbestos, a so-called non-asbestos friction material composition.

[Friction Material Composition]

A friction material composition of an embodiment of the present invention contains a binder, an organic filler, an inorganic filler and a fibrous base material, wherein the friction material composition either contains no copper as an element or has a content of copper as an element that does not exceed 0.5% by mass, contains α-alumina and γ-alumina in a mass ratio within a range from 1:20 to 1:5, contains a silicone-containing phenol resin, contains 20 to 35% by mass of a titanate salt, contains 3 to 7% by mass of a graphite having a median diameter of 1 to 30 μm, and contains antimony trisulfide. The above expression "copper as an element" describes the content, within the entire friction material composition, of copper element contained in copper in fibrous or powdered form or the like, a copper alloy and a copper compound.

[Binder]

The friction material composition of the present invention contains a binder. The binder integrates the organic filler and the fibrous base material and the like contained in the friction material composition and imparts the composition with strength.

The friction material composition of the present embodiment contains a silicone-containing phenol resin as a binder. A phenol resin having a silicone oil or silicone rubber dispersed therein is preferably used as the silicone-containing phenol resin. When a silicone-containing phenol resin is used, the water repellency at the friction interface can be enhanced, enabling the friction coefficient after standing at high humidity to be stabilized.

In the friction material composition according to the present embodiment, the silicone-containing phenol resin described above may be used alone as the binder, but one or more of phenol resins, examples thereof including an acrylic rubber-containing phenol resin, a cashew-modified phenol resin, an epoxy-modified phenol resin and an alkylbenzene-modified phenol resin, may also be used in combination with the silicone-containing phenol resin.

The amount of the binder in the friction material composition of the present invention is preferably within a range from 5 to 20% by mass, more preferably within a range from 5 to 15% by mass, and even more preferably within a range from 5 to 10% by mass. In those cases where the amount of the filler in the friction material composition is within a range from 5 to 20% by mass, a deterioration in the strength of the friction material can be further suppressed, and a deterioration in the sound vibration performance such as squealing caused by a reduction in the porosity of the friction material and the increase in the elastic modulus, can also be suppressed.

[Organic Filler]

The friction material composition of the present invention contains an organic filler. The organic filler is included as a friction adjuster for improving the sound vibration performance and abrasion resistance and the like of the friction material.

The friction material composition of the present invention preferably contains cashew dust as an organic filler. Cashew dust may be any cashew dust that is usually used in a friction material, and is obtained grinding a product obtained polymerizing and curing cashew nut shell oil. The amount of cashew dust in the friction material composition is preferably within a range from 1 to 10% by mass, more preferably within a range from 1 to 8% by mass, and even more preferably within a range from 2 to 7% by mass. In those cases where the amount of cashew dust is within a range from 1 to 10% by mass, deterioration in the sound vibration performance such as squealing caused by an increase in the elastic modulus of the friction material can be avoided, and deterioration in the heat resistance and/or deterioration in the strength due to heat history can also be avoided.

In the friction material composition of the present invention, besides the cashew dust described above, a rubber component may also be used as an organic filler. Examples of the rubber component include tire rubber, acrylic rubber, isoprene rubber, NBR (nitrile butadiene rubber) and SBR (styrene butadiene rubber), and these rubbers may be used individually, or a combination of two or more types of rubber may be used. In those cases where a combination of cashew dust and a rubber component is used, a material in which the cashew dust is coated with the rubber component may be used, or the cashew dust and the rubber component may be used separately.

The amount of the organic filler in the friction material composition of the present invention is preferably within a range from 1 to 20% by mass, more preferably within a range from 1 to 15% by mass, and even more preferably within a range from 2 to 10% by mass. In those cases where the amount of the organic filler is within a range from 1 to 20% by mass, deterioration in the sound vibration performance such as squealing caused by an increase in the elastic modulus of the friction material can be avoided, and deterioration in the heat resistance and/or deterioration in the strength due to heat history can also be avoided.

[Inorganic Filler ($\alpha$-Alumina, $\gamma$-Alumina)]

The friction material composition of the present invention contains an inorganic filler. The inorganic filler is included as a friction adjuster for the purposes of adjusting the friction coefficient of the friction material and improving the heat resistance, and the component, particle size, hardness, shape and the like thereof may vary. Because the most common disc rotor that functions as the mating material is composed of cast iron with a Mohs hardness of about 4.5, an inorganic filler having a Mohs hardness of 5 or higher can function as an abrasive and increase the friction coefficient. However, when an inorganic filler having a Mohs hardness of 5 or higher is used, a deterioration in the abrasion resistance of the friction material and an increase in the attacking properties relative to the disc rotor may sometimes be problematic, and therefore a reduction in the amount added of the inorganic filler, a reduction in the particle size, or a combination of both these measures may sometimes be necessary.

In the friction material composition of the present invention, a combination of $\alpha$-alumina and $\gamma$-alumina having a Mohs hardness of 5 or higher may be used as the inorganic filler.

$\alpha$-alumina has a high Mohs hardness of 8 to 9, and is effective in generating a friction coefficient by grinding. However, if the amount added of $\alpha$-alumina is increased excessively, or particles having an excessively large particle size are used, then not only may the abrasion resistance of the friction material sometimes deteriorate markedly, but attack on the disc rotor may sometimes also increase excessively. On the other hand, $\gamma$-alumina has a Mohs hardness of 5 to 6, and therefore compared with $\alpha$-alumina, $\gamma$-alumina may be added in a larger amount, at a larger particle size, or in both a large amount and at a larger particle size.

As a result of intensive investigation, the inventors of the present invention has discovered that by including $\alpha$-alumina and $\gamma$-alumina in a specific ratio, a combination of maintenance of the friction coefficient during high-speed and high-temperature braking and abrasion resistance for the friction material can be achieved. The mass ratio between the $\alpha$-alumina and the $\gamma$-alumina is preferably within a range from 1:20 to 1:5, more preferably within a range from 1:10 to 1:5, and even more preferably within a range from 1:8 to 1:5. By ensuring that the mass ratio between the $\alpha$-alumina and the $\gamma$-alumina is within a range from 1:20 to 1:5, the friction coefficient can be maintained during high-speed and high-temperature braking can be maintained, while deterioration in the abrasion resistance of the friction material can be suppressed.

For similar reasons to those mentioned above, the total amount of the $\alpha$-alumina and the $\gamma$-alumina is preferably within a range from 1 to 10% by mass, more preferably within a range from 1 to 8% by mass, and even more preferably within a range from 1 to 5% by mass.

For similar reasons to those mentioned above, the median diameter of the $\alpha$-alumina is preferably within a range from 0.5 to 10 $\mu$m, more preferably within a range from 0.5 to 5 $\mu$m, and even more preferably within a range from 0.5 to 3 $\mu$m. Further, the median diameter of the $\gamma$-alumina is preferably within a range from 5 to 500 μm, more preferably from 10 to 400 μm, and even more preferably from 20 to 350 μm.

The median diameter can be measured using a method such as laser diffraction particle size distribution analysis. For example, the median diameter can be measured using a laser diffraction/scattering particle size distribution analyzer such as the product LA-920 (manufactured by Horiba, Ltd.). Further, the median diameter can also be measured by sieve classification typified by JIS B 4130 and the like.

[Inorganic Filler (Graphite)]

Further, the friction material composition of the present invention contains graphite as an inorganic filler. Adding graphite may enable the friction material to be imparted with thermal conductivity, but excessive addition may sometimes cause a reduction in the friction coefficient. Accordingly, the particle size and amount added of the graphite are preferably optimized.

The median diameter of the graphite is preferably within a range from 1 to 30 μm more preferably from 1 to 20 μm, and even more preferably from 5 to 15 μm. By ensuring that the median diameter of the graphite is within a range from 1 to 30 μm, the graphite can be more easily dispersed uniformly through the friction material, the heat generated during braking can be more easily diffused from the friction interface, and the friction characteristics during high-speed and high-temperature braking can be stabilized.

The amount of graphite in the friction material composition is preferably within a range from 3 to 7% by mass, more preferably within a range from 3 to 6% by mass, and even more preferably within a range from 4 to 6% by mass. By ensuring that the amount of graphite is within a range from 3 to 7% by mass, a combination of impartation of thermal conductivity to the friction material and maintenance of the friction coefficient can be achieved.

[Inorganic Filler (Titanate Salt)]

The friction material composition of the present invention contains from 20 to 35% by mass of a titanate salt as an inorganic filler. Titanate salts have a low Mohs hardness of about 4, but have a comparatively high melting point of 1,000° C. or higher, and therefore by including a titanate salt at the friction interface during high-speed and high-temperature braking, an increase in abrasion of the friction material or deterioration in the friction coefficient can be reduced. The amount of the titanate salt in the friction material composition is more preferably within a range from 20 to 30% by mass, and even more preferably from 22 to 28% by mass. By ensuring that the amount of the titanate salt is at least 20% by mass, the effect of the invention in maintaining the friction coefficient during high-speed and high-temperature braking can be more easily maintained, whereas by ensuring that the amount of the titanate salt is not more than 35% by mass, a more favorable friction coefficient can be achieved at low speed and low temperature.

A combination of potassium titanate and lithium potassium titanate is preferably used as the above titanate salt. In those cases where a combination of these two salts are used, a combination of effective braking performance and abrasion resistance can be achieved at an even higher level. Either potassium 6-titanate or potassium 8-titanate may be used as the potassium titanate.

[Inorganic Filler (Antimony Trisulfide)]

The friction material composition of the present invention contains antimony trisulfide as an inorganic filler. Antimony trisulfide has a Mohs hardness of 3 or lower, and exhibits favorable abrasive performance. The amount of antimony trisulfide in the friction material composition is preferably within a range from 0.5 to 12% by mass, more preferably within a range from 1 to 10% by mass, and even more preferably within a range from 1 to 6% by mass. In those cases where the amount of antimony trisulfide is within a range from 0.5 to 12% by mass, superior abrasion resistance can be achieved.

[Other Inorganic Fillers]

The friction material composition may also include one or more other inorganic fillers, and examples of other inorganic fillers that may be used include zirconium oxide, magnesium oxide, zirconium silicate, calcium silicate, magnesium titanate, sodium titanate, tin sulfide, molybdenum disulfide, iron sulfide, bismuth sulfide, zinc sulfide, calcium hydroxide, calcium oxide, sodium carbonate, calcium carbonate, magnesium carbonate, barium sulfate, dolomite, coke, mica, iron oxide, vermiculite, calcium sulfate, talc, clay, zeolite, zirconium silicate, mullite, chromite, titanium oxide and silica. These inorganic fillers may be used individually, or a combination of two or more fillers may be used.

The total amount of inorganic fillers in the friction material composition is preferably within a range from 20 to 80% by mass, more preferably within a range from 30 to 80% by mass, and even more preferably within a range from 40 to 80% by mass. In those cases where the amount of inorganic fillers is within a range from 20 to 80% by mass, deterioration in the heat resistance can be avoided.

[Fibrous Base Material]

The friction material composition of the present invention contains a fibrous base material. The fibrous base material exhibits a reinforcing effect in the friction material. Examples of the fibrous base material include organic fibers, inorganic fibers, and metal fibers and the like.

Examples of the organic fibers which may be used in the friction material composition of the present invention include aramid fibers, acrylic fibers, cellulose fibers, and phenol resin fibers, and one type of these fibers may be used individually, or a combination of two or more types of these fibers may be used. Among these fibers, from the viewpoints of the heat resistance and the reinforcing effect, the use of aramid fibers is preferred.

Examples of the inorganic fibers which may be used in the friction material composition of the present invention include wollastonite, ceramic fibers, biodegradable ceramic fibers, mineral fibers, carbon fibers, glass fibers, potassium titanate fibers, and aluminosilicate fibers, and one type of these fibers may be used individually, or a combination of two or more types of these fiber may be used. From the viewpoint of the effects on the human body, the composition preferably does not contain inhalable potassium titanate fibers or the like.

In this description, the term "mineral fiber" refers to melt spun artificial inorganic fibers using a blast furnace slag such as slag wool, basalt such as basalt fiber, and/or melt spun artificial inorganic fibers containing other natural rock as the main component, and the mineral fibers are preferably fibers of a natural mineral that contains Al element. Specific examples of the mineral fibers include fibers containing $SiO_2$, $Al_2O_3$, CaO, MgO, FeO, $Na_2O$ and/or the like, and mineral fibers containing either one type, or two or more types, of these compounds, and among these, fibers containing Al element are particularly preferred.

The mineral fibers used in the present invention are preferably biosoluble. In this description, the expression "biosoluble mineral fibers" refers to a mineral fiber which, even if ingested into the human body, undergoes partial decomposition and excretion from the body in a short period of time. Specifically, the "biosoluble mineral fibers" refers to fibers which have a chemical composition in which the total amount of alkali oxides and alkaline earth oxides (namely, the total amount of oxides of sodium, potassium, calcium, magnesium and barium) is at least 18% by mass; and which in a short-term biopersistence test by inhalation, exhibit a mass half-life for fibers having a length of at least 20 μm of no longer than 40 days, or in an intraperitoneal test exhibit no evidence of excessive carcinogenicity, or in a long-term inhalation test exhibit no related pathogenicity or oncogenesis (Nota Q of EU Directive 97/69/EC (excluded from carcinogenic classification)). Examples of such biosoluble mineral fibers include $SiO_2$—$Al_2O_3$—$CaO$—$MgO$—$FeO$—$Na_2O$-based fibers, and fibers containing any combination of $SiO_2$, $Al_2O_3$, $CaO$, $MgO$, $FeO$, $Na_2O$ and the like. Examples of commercially available products include the ROXUL series of products (wherein "ROXUL" is a registered trademark) manufactured by LAPINUS FIBERS B.V. ROXUL contains $SiO_2$, $Al_2O_3$, $CaO$, $MgO$, $FeO$, and $Na_2O$ and the like.

As metal fibers, any of iron fibers, titanium fibers, zinc fibers, or aluminum fibers or the like may be used, and one type of these fibers may be used individually, or a combination of two or more types of these fiber may be used. However, from the viewpoint of suppressing attack on the disc rotor that functions as the mating material, the metal fibers preferably contain no iron in the form of metal, or has a metallic iron content not exceeding 3% by mass, more preferably has a metallic iron content not exceeding 2% by mass, and even more preferably contains no iron in the form of metal.

The amount of the fibrous base material included in the friction material composition is preferably within a range from 5 to 40% by mass, more preferably within a range from 5 to 35% by mass, and even more preferably within a range from 6 to 30% by mass. In those cases where the amount of the fibrous base material is within a range from 5 to 40% by mass, an appropriate reinforcing effect can be imparted to the friction material without causing adverse effects such as a dramatic deterioration in the efficacy characteristics.

[Metal Powder]

The friction material composition of the present invention may include a metal powder. Examples of the metal powder include iron powder, tin powder, zinc powder, and aluminum powder and the like, as well as alloy powders containing these metals, and these powders may be used individually, or a combination of two or more powders may be used. However, from the viewpoint of suppressing attack on the disc rotor that functions as the mating material, the metal powder preferably contains no iron in the form of metal, or has a metallic iron content not exceeding 3% by mass, more preferably has a metallic iron content not exceeding 2% by mass, and even more preferably contains no iron in the form of metal.

The friction material composition of the present invention more preferably includes a zinc powder. Zinc has a large ionization tendency than iron, and therefore oxidizes more readily than iron. Accordingly, in those case where a zinc powder is included, the disc rotor or abrasion powder from the disc rotor is less likely to rust at the friction interface, and the friction coefficient after standing at high humidity can be more easily stabilized. The amount of zinc powder in the friction material composition is preferably within a range from 1 to 6% by mass, more preferably from 1 to 5% by mass, even more preferably from 1 to 4% by mass, and still more preferably from 2 to 4% by mass. When the amount of the zinc powder is within a range from 1 to 6% by mass, it is possible to more easily achieve a combination of a rustproofing effect and superior abrasion resistance.

The range of metal powders that may be used in the friction material composition of the present invention are not particularly restricted in terms of particle size or shape or the like, provided there is no dramatic deterioration in the characteristics of the composition. For example, in terms of shape, spherical particles produced by typical atomization methods or the like or columnar particles produced by typical cutting methods or the like may be used. The purity as a metal is preferably at least 90%, but the metal powder surface may be modified to a metal oxide or the like as a result of long-term storage of the metal powder or the friction material composition.

[Other Components]

Besides the materials described above, the friction material composition of the present invention may also include one or more other materials as required.

<Friction Material and Friction Member>

The friction material composition of the present invention can be used as a friction material such as a disc brake pad or brake lining for an automobile or the like, or the friction material composition of the present embodiment may be used as a friction material such as a clutch facing, an electromagnetic brake or a holding brake or the like by subjecting the composition to steps such as molding, processing, or bonding or the like to achieve the required shape.

The friction material composition of the present invention may be used as a friction member that forms a friction surface, thus obtaining a friction material. Examples of friction materials employing such a configuration include the structures described below.

(1) Structures composed of only a friction member.

(2) Structures having a backing plate and a friction member formed with the friction material composition of the present invention, which is formed on top of the backing plate and functions as a friction surface.

(3) Structures based on the structure (2) above, in which a primer layer used to modify the surface of the backing plate to improve the effect of adhesion of the backing plate, or an adhesive layer to facilitate adhesion between the backing plate and the friction member, is interposed between the backing plate and the friction member.

The backing plate mentioned above is typically used in a friction member to improve the mechanical strength of the friction member, and examples of materials that may be used for the backing plate include metals and fiber-reinforced plastics and the like, and specific examples include iron, stainless steel, inorganic fiber-reinforced plastics, and carbon fiber-reinforced plastics. Examples of the primer layer and adhesive layer include those typically used in friction members such as brake shoes.

A friction material can be produced from the friction material composition of the present invention using typically used methods.

The friction material of the present invention may be obtained molding the friction material composition of the present invention. The friction material of the present invention can be produced, for example, by subjecting the friction material composition of the present invention to hot press molding. In a specific example, the friction material of the present embodiment can be obtained by uniformly mixing the friction material composition of the present embodiment using a mixing device such as LOEDIGE mixer (wherein LOEDIGE is a registered trademark), a pressurized kneader or an EIRICH mixer (wherein EIRICH is a registered trademark), subjecting the resulting mixture to preforming in a molding die, molding the thus obtained preform under conditions including a molding temperature of 130 to 160° C., a molding pressure of 20 to 50 MPa and a molding time of 2 to 10 minutes, and then subjecting the obtained molded product to a heat treatment at 150 to 250° C. for 2 to 10 hours. If necessary, the friction material may also be subjected to coating, a scorching treatment, or a polishing treatment or the like.

The friction material composition of the present invention exhibits excellent stability of the friction coefficient and superior abrasion resistance at high temperature, and is therefore useful as the "upper layer material" of a friction member such as a disc brake pad or brake lining, but can also be molded and used as the "lower layer material" of a friction member.

The "upper layer material" refers to the friction material that forms the friction surface of the friction member, whereas the "lower layer material" refers to the layer that is interposed between the friction material that forms the friction surface and the backing plate of the friction member, and has the purpose of improving the shear strength and crack resistance in the vicinity of the bond between the friction material and the backing plate.

Embodiments of the present invention include those described below. However, the present invention is not limited to the following embodiments.

<1> A friction material composition containing a binder, an organic filler, an inorganic filler and a fibrous base material, wherein:

the friction material composition either contains no copper as an element or has a content of copper as an element that does not exceed 0.5% by mass, the friction material composition contains α-alumina and γ-alumina in a mass ratio within a range from 1:20 to 1:5, the friction material composition contains a silicone-containing phenol resin, the friction material composition contains 20 to 35% by mass of a titanate salt, the friction material composition contains 3 to 7% by mass of a graphite having a median diameter of 1 to 30 μm, and the friction material composition contains antimony trisulfide.

<2> The friction material composition according to <1>, wherein the total amount of the α-alumina and the γ-alumina is from 1 to 10% by mass.

<3> The friction material composition according to <1> or <2>, containing 1 to 4% by mass of a zinc powder.

<4> The friction material composition according to any one of <1> to <3>, containing both potassium titanate and lithium potassium titanate as the titanate salt.

<5> A friction material obtained by molding the friction material composition according to any one of <1> to <4>.

<6> A friction member including the friction material according to <5> and a backing plate integrated with the friction material.

The entire contents of the disclosure of prior Japanese Application 2017-197555 filed on Oct. 11, 2017 are incorporated in the present application by reference.

EXAMPLES

The present invention is described below in further detail using a series of examples. However, the present invention is in no way limited by these examples.

Examples 1 to 6 and Comparative Examples 1 to 8

[Production of Disc Brake Pads]

Materials were blended in accordance with the blend ratios shown in Tables 1 and 2 to obtain friction material compositions of Examples 1 to 6 and Comparative Examples 1 to 8.

Each of these friction material compositions was mixed using a LOEDIGE mixer (product name: LOEDIGE Mixer M20, manufactured by MATSUBO Corporation). This mixture was subjected to preforming using a molding press (manufactured by Oji Machine Co., Ltd.), the thus obtained preform was hot press-molded together with a backing plate (formed from iron) manufactured by Hitachi Automotive Systems, Ltd., using a molding press (manufactured by Sanki Seiko Co., Ltd.) under conditions including a molding temperature of 145° C., a molding pressure of 35 MPa, and a molding time of 5 minutes, and the thus obtained molded article was then subjected to a heat treatment at 200° C. for 4.5 hours, polished with a rotary polisher, and then subjected to a scorching treatment at 500° C. to obtain a disc brake pad (in which the thickness of the friction material was 9.5 mm, and the projected surface area of the friction material was 52 $cm^2$).

The various materials used in the examples and comparative examples were as follows.

[Binders]
  Resin A (silicone-containing phenol resin): RX2325C manufactured by Mitsui Chemicals, Inc.
  Resin B (phenol resin): HP491UP manufactured by Hitachi Chemical Co., Ltd.
  Resin C (acrylic rubber-containing phenol resin): PR1950W manufactured by Hitachi Chemical Co., Ltd.
[Organic Fillers]
  Cashew dust
  Rubber component (tire rubber powder): powder TPA manufactured by Carquest Corporation
[Inorganic Fillers]
  Titanate salt A: TERRACESS TF-L (potassium titanate), manufactured by Otsuka Chemical Co., Ltd.
  Titanate salt B: TERRACESS L (lithium potassium titanate), manufactured by Otsuka Chemical Co., Ltd.
  Barium sulfate
  Graphite A: manufactured by TIMCAL Ltd. (media diameter: 8 μm)
  Graphite B: manufactured by TIMCAL Ltd. (media diameter: 350 μm)
  Antimony trisulfide
  Calcium hydroxide
  Zirconium oxide
  α-alumina: manufactured by Showa Denko K.K.
  γ-alumina: manufactured by Mizusawa Industrial Chemicals, Ltd. (median diameter: 28 μm)
[Fibrous Base Materials]
  Copper fiber
  Aramid fiber (organic fiber)
  Mineral fiber (inorganic fiber)
[Metal Powder]
  Zinc powder: manufactured by Fukuda Metal Foil & Powder Co., Ltd.

The disc brake pads of Examples 1 to 6 and Comparative Examples 1 to 8 produced using the method described above were evaluated for a variety of performance properties using a Brake Dynamometer (manufactured by Shin Nippon Tokki Co., Ltd.). In the testing, a typical pin sliding collet caliper and a ventilated disc rotor (FC250 (gray cast iron)) manufactured by KIRIU Corporation were used, and evaluation was performed using the moment of inertia of a Skyline V35 manufactured by Nissan Motor Co., Ltd.

[Evaluation of Friction Coefficient at High-Speed (245 km/h) Braking]

Testing was conducted under conditions including an atmospheric temperature of 25° C. and a humidity of 30%, and was performed in accordance with JASO C406. However, in the second efficacy test, braking at 245 km/h and 0.6 G was added to evaluate the friction coefficient at high-speed braking. In the evaluation of the friction coefficient at high-speed braking, a value of 0.20 to 0.25 was evaluated as excellent and recorded as "OO", a value of 0.16 to 0.19 was evaluated as good and recorded as "O", and a value of 0.15 or less was evaluated as poor and recorded as "X", with the results being recorded in Table 1 and Table 2.

[Evaluation of Increase in Friction Coefficient after Standing in High Humidity]

Testing was conducted under conditions including an atmospheric temperature of 30° C. and a humidity of 75%. First, 200 repetitions of braking at 60 km/h and 0.3 G were performed, and immediately thereafter, 5 repetitions of braking at 5 km/h and 1 MPa were performed, and the average value was deemed the "friction coefficient prior to standing". Subsequently, the brakes were left to stand for 6 hours, and 5 further repetitions of braking at 5 km/h and 1 MPa were performed, and the average value was deemed the "friction coefficient after standing".

The increase in the friction coefficient was calculated as "friction coefficient after standing"/"friction coefficient prior to standing"="increase in friction coefficient after standing at high humidity", a value of 1.0 to 1.1 was evaluated as excellent and recorded as "OO", a value of 1.2 to 1.3 was evaluated as good and recorded as "O", and a value of 1.4 or greater was evaluated as poor and recorded as "X", with the results being recorded in Table 1 and Table 2.

[Evaluation of Abrasion Resistance]

Testing was conducted in accordance with JASO C427, and the abrasion loss of the disc pad at a brake temperature prior to braking of 400° C. was measured. The measured abrasion loss values were evaluated as the abrasion resistance. In the abrasion loss evaluation, a value of less than 0.80 mm was evaluated as excellent and recorded as "OO", a value of 0.80 to 1.20 mm was evaluated as good and recorded as "O", and a value of 1.21 mm or greater was evaluated as poor and recorded as "X", with the results being recorded in Table 1 and Table 2.

TABLE 1

| | Item | | | | Examples | | | | |
|---|---|---|---|---|---|---|---|---|---|
| | | | | 1 | 2 | 3 | 4 | 5 | 6 |
| Blend amount (% by mass) | Binder | Resin A | | 10 | 10 | 10 | 5 | 10 | 5 |
| | | Resin B | | 0 | 0 | 0 | 5 | 0 | 5 |
| | | Resin C | | 0 | 0 | 0 | 0 | 0 | 0 |
| | Organic filler | Cashew dust | | 5 | 5 | 5 | 5 | 5 | 5 |
| | | Rubber component | | 2 | 2 | 2 | 2 | 2 | 2 |
| | Fibrous base material | Copper fiber | | 0 | 0 | 0 | 0 | 0 | 0 |
| | | Aramid fiber | | 3 | 3 | 3 | 3 | 3 | 3 |
| | | Mineral fiber | | 3 | 3 | 3 | 3 | 3 | 3 |
| | Metal powder | Zinc powder | | 0 | 0 | 0 | 0 | 3 | 0 |
| | Inorganic filler | α-alumina | | 1 | 0.5 | 0.5 | 0.5 | 0.5 | 0.5 |
| | | γ-alumina | | 8 | 3 | 5 | 3 | 5 | 3 |
| | | Potassium titanate | | 17 | 15 | 10 | 10 | 10 | 10 |
| | | Lithium potassium titanate | | 17 | 15 | 10 | 10 | 10 | 10 |
| | | Graphite A | | 5 | 5 | 5 | 4 | 5 | 4 |
| | | Graphite B | | 0 | 0 | 0 | 0 | 0 | 0 |
| | | Zirconium oxide | | 20 | 20 | 20 | 20 | 20 | 20 |
| | | Antimony trisulfide | | 2 | 2 | 2 | 2 | 2 | 2 |
| | | Calcium hydroxide | | 2 | 2 | 2 | 2 | 2 | 2 |
| | | Barium sulfate | | 5 | 14.5 | 22.5 | 25.5 | 19.5 | 25.5 |
| Evaluation results | Friction coefficient at 245 km/h | | | OO | OO | O | OO | O | O |
| | Increase in friction coefficient after standing at high humidity | | | O | OO | O | OO | OO | O |
| | Abrasion resistance at 400° C. | | | O | OO | O | O | O | O |

TABLE 2

| | Item | | 1 | 2 | 3 | 4 | Comparative Examples 5 | 6 | 7 | 8 |
|---|---|---|---|---|---|---|---|---|---|---|
| Blend amount (% by mass) | Binder | Resin A | 0 | 0 | 10 | 10 | 10 | 10 | 10 | 0 |
| | | Resin B | 10 | 0 | 0 | 0 | 0 | 0 | 0 | 10 |
| | | Resin C | 0 | 10 | 0 | 0 | 0 | 0 | 0 | 0 |
| | Organic filler | Cashew dust | 5 | 5 | 5 | 5 | 5 | 5 | 5 | 5 |
| | | Rubber component | 2 | 2 | 2 | 2 | 2 | 2 | 2 | 2 |
| | Fibrous base material | Copper fiber | 0 | 0 | 0 | 0 | 0 | 0 | 0 | 10 |
| | | Aramid fiber | 3 | 3 | 3 | 3 | 3 | 3 | 3 | 3 |
| | | Mineral fiber | 3 | 3 | 3 | 3 | 3 | 3 | 3 | 3 |

TABLE 2-continued

| Item | | Comparative Examples | | | | | | | |
|---|---|---|---|---|---|---|---|---|---|
| Metal powder | Zinc powder | 0 | 0 | 0 | 0 | 0 | 0 | 0 | 0 |
| Inorganic filler | α-alumina | 0.5 | 0.5 | 0.5 | 0.5 | 1 | 1 | 0.5 | 0.5 |
| | γ-alumina | 3 | 3 | 3 | 3 | 4 | 0 | 3 | 0 |
| | Potassium titanate | 15 | 15 | 15 | 5 | 15 | 15 | 15 | 8 |
| | Lithium potassium titanate | 15 | 15 | 15 | 5 | 15 | 15 | 15 | 8 |
| | Graphite A | 5 | 5 | 0 | 5 | 5 | 5 | 5 | 5 |
| | Graphite B | 0 | 0 | 2 | 0 | 0 | 0 | 0 | 0 |
| | Zirconium oxide | 20 | 20 | 20 | 20 | 20 | 20 | 20 | 20 |
| | Antimony trisulfide | 2 | 2 | 2 | 2 | 2 | 2 | 0 | 2 |
| | Calcium hydroxide | 2 | 2 | 2 | 2 | 2 | 2 | 2 | 2 |
| | Barium sulfate | 14.5 | 14.5 | 17.5 | 34.5 | 13 | 17 | 16.5 | 21.5 |
| Evaluation results | Friction coefficient at 245 km/h | ○○ | ○○ | X | X | ○○ | X | ○ | ○○ |
| | Increase in friction coefficient after standing at high humidity | X | X | ○ | ○○ | ○○ | ○○ | ○○ | X |
| | Abrasion resistance at 400° C. | ○○ | ○○ | ○○ | X | X | ○○ | X | ○○ |

Similarly to Comparative Example 8 which contained copper, Examples 1 to 6 exhibited favorable results (namely, an evaluation of ○○ or ○) for the friction coefficient at high-speed and high-temperature braking and the abrasion resistance at 400° C. Further, unlike Comparative Example 8, Examples 1 to 6 also exhibited favorable results for the increase in friction coefficient after standing at high humidity.

Among Comparative Examples 1 and 2 which used no silicone-containing phenol resin, Comparative Example 3 in which graphite having a median diameter of 1 to 30 μm was not added, but the graphite B having a median diameter greater than 30 μm was added in an amount of less than 3% by mass, Comparative Example 4 in which the total amount of added titanate salts was less than 20% by mass, Comparative Example 5 in which the amount of γ-alumina was less than 5 times the amount of α-alumina, Comparative Example 6 which contained only α-alumina and contained no γ-alumina, and Comparative Example 7 which contained no antimony trisulfide, none of these compositions was able to satisfy all of the superior friction coefficient upon high-speed and high-temperature braking, the superior stability of the friction coefficient after standing at high humidity, and the favorable abrasion resistance at 400° C.

INDUSTRIAL APPLICABILITY

Compared with conventional products, the friction material composition of the present invention has a high environmental impact, and yet exhibits a stable friction coefficient during high-speed and high-temperature braking and after standing at high humidity even not using copper, and is therefore suitable for friction materials and friction members not only for general vehicle applications, but also for the brake pads for vehicles fitted with controlled braking such as regenerative braking.

The invention claimed is:

1. A friction material composition comprising a binder, an organic filler, an inorganic filler and a fibrous base material, wherein:
the friction material composition either comprises no copper as an element or has a content of copper as an element that does not exceed 0.5% by mass,
the friction material composition comprises α-alumina and γ-alumina in a mass ratio within a range from 1:6 to 1:less than 8,
a total amount of the α-alumina and the γ-alumina is within a range from 3.5 to 5% by mass,
a median diameter of the γ-alumina is within a range from 5 to 28 μm
the friction material composition comprises a silicone-containing phenol resin,
the friction material composition comprises 22 to 30% by mass of a titanate salt,
the friction material composition comprises both potassium titanate and lithium potassium titanate as the titanate salt,
the friction material composition comprises 3 to 7% by mass of a graphite having a median diameter of 1 to 30 μm, and
the friction material composition comprises antimony trisulfide in an amount within a range from 0.5 to 2% by mass.

2. The friction material composition according to claim 1, comprising 1 to 4% by mass of a zinc powder.

3. The friction material composition according to claim 1, comprising zirconium oxide.

4. A friction material obtained by molding the friction material composition according to claim 1.

5. A friction member comprising the friction material according to claim 4 and a backing plate integrated with the friction material.

6. A friction material composition, comprising:
a binder comprising a silicone-containing phenol resin;
an organic filler;
an inorganic filler comprising:
α-alumina and γ-alumina in a mass ratio within a range from 1:6 to 1:less than 8, a total amount of the α-alumina and the γ-alumina being within a range from 3.5 to 5% by mass, wherein a median diameter of the γ-alumina is within a range from 5 to 28 μm,
22 to 30% by mass of a titanate salt,
titanate salt comprising both potassium titanate and lithium potassium titanate,
3 to 7% by mass of a graphite having a median diameter of 1 to 30 μm, and
0.5 to 2% by mass of antimony trisulfide; and
a fibrous base material,
wherein the friction material composition either comprises no copper as an element or has a content of copper as an element that does not exceed 0.5% by mass.

7. The friction material composition according to claim 6, comprising 1 to 4% by mass of a zinc powder.

8. The friction material composition according to claim 6, comprising zirconium oxide.

9. A friction material obtained by molding the friction material composition according to claim 6.

10. A friction member comprising the friction material according to claim 9 and a backing plate integrated with the friction material.

* * * * *